(12) United States Patent
Yilmaz et al.

(10) Patent No.: US 11,327,583 B2
(45) Date of Patent: May 10, 2022

(54) TOUCH-SENSITIVE SYSTEM WITH MOTION FILTERING

(71) Applicant: Wacom Co., Ltd., Saitama (JP)

(72) Inventors: Esat Yilmaz, Santa Cruz, CA (US); Vemund Kval Bakken, Menlo Park, CA (US); Kishore Sundara-Rajan, San Jose, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/579,525

(22) Filed: Sep. 23, 2019

(65) Prior Publication Data

US 2020/0019250 A1 Jan. 16, 2020

Related U.S. Application Data

(63) Continuation of application No. 13/553,532, filed on Jul. 19, 2012, now Pat. No. 10,423,248.

(60) Provisional application No. 61/553,114, filed on Oct. 28, 2011.

(51) Int. Cl.
  *G06F 3/038* (2013.01)
  *G06F 3/0354* (2013.01)
  *G06F 3/041* (2006.01)
  *G06F 3/04883* (2022.01)

(52) U.S. Cl.
  CPC .......... *G06F 3/038* (2013.01); *G06F 3/03545* (2013.01); *G06F 3/0418* (2013.01); *G06F 3/04883* (2013.01); *G06F 2203/0384* (2013.01)

(58) Field of Classification Search
  CPC .... G06F 3/038; G06F 3/03545; G06F 3/0418; G06F 3/04883; G06F 2203/0384

USPC .................................................. 345/173–174
  See application file for complete search history.

(56) References Cited

U.S. PATENT DOCUMENTS

| | | | |
|---|---|---|---|
| 2,501,233 A | 3/1950 | O'Brien | |
| 2,898,574 A | 8/1959 | Palmer | |
| 4,695,680 A | 9/1987 | Kable | |
| 5,570,113 A | 10/1996 | Zetts | |
| 5,598,187 A | 1/1997 | Ide et al. | |
| 5,973,677 A | 10/1999 | Gibbons | |
| 6,130,918 A | 10/2000 | Humphrey et al. | |
| 6,529,144 B1 * | 3/2003 | Nilsen ............... | G06F 1/1613 340/568.1 |
| 7,176,902 B2 | 2/2007 | Peterson, Jr. et al. | |

(Continued)

FOREIGN PATENT DOCUMENTS

WO 2012/129247 A2 9/2012

OTHER PUBLICATIONS

U.S. Appl. No. 61/454,936, filed Mar. 21, 2011, Myers (unpublished application).

(Continued)

*Primary Examiner* — Kent W Chang
*Assistant Examiner* — Sujit Shah
(74) *Attorney, Agent, or Firm* — Seed IP Law Group LLP

(57) ABSTRACT

In one embodiment, computer-readable non-transitory storage media receive one or more signals based on motion of an object, a device, or both. The received signals are compared to a motion profile which defines unintended motion of the object, the device, or both, and this comparison determines whether any of the signals represent unintended motion of the stylus or device. The received signals are then processed to correct for the unintended motion defined by the motion profile.

18 Claims, 5 Drawing Sheets

(56) References Cited

U.S. PATENT DOCUMENTS

| | | | |
|---|---|---|---|
| 7,612,767 B1 | 11/2009 | Griffin et al. | |
| 7,663,607 B2 | 2/2010 | Hotelling et al. | |
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |
| 8,179,381 B2 | 5/2012 | Frey et al. | |
| 8,902,154 B1* | 12/2014 | Kahn | G06F 1/1694 345/156 |
| 8,949,070 B1* | 2/2015 | Kahn | G01C 22/006 702/160 |
| 2005/0078093 A1 | 4/2005 | Peterson, Jr. et al. | |
| 2005/0131856 A1* | 6/2005 | O'Dea | H04N 5/232 |
| 2005/0190059 A1* | 9/2005 | Wehrenberg | G08B 25/008 340/571 |
| 2006/0007188 A1 | 1/2006 | Reiner | |
| 2007/0152976 A1 | 7/2007 | Townsend et al. | |
| 2007/0213045 A1 | 9/2007 | Hermansson et al. | |
| 2008/0012838 A1 | 1/2008 | Rimon | |
| 2008/0180045 A1 | 7/2008 | Sladek et al. | |
| 2008/0238885 A1 | 10/2008 | Zachut et al. | |
| 2008/0260252 A1 | 10/2008 | Borgaonkar et al. | |
| 2009/0058818 A1 | 3/2009 | Chang et al. | |
| 2009/0095540 A1 | 4/2009 | Zachut et al. | |
| 2009/0115725 A1 | 5/2009 | Shemesh et al. | |
| 2009/0127005 A1 | 5/2009 | Zachut et al. | |
| 2009/0153152 A1 | 6/2009 | Maharyta et al. | |
| 2009/0184939 A1 | 7/2009 | Wohlstadter et al. | |
| 2009/0251434 A1 | 10/2009 | Rimon et al. | |
| 2009/0300492 A1 | 12/2009 | Venkatesan et al. | |
| 2009/0303177 A1* | 12/2009 | Chou | G06F 1/1626 345/156 |
| 2009/0315854 A1 | 12/2009 | Matsuo | |
| 2010/0006350 A1 | 1/2010 | Elias | |
| 2010/0127995 A1 | 5/2010 | Rigazio et al. | |
| 2010/0155153 A1 | 6/2010 | Zachut | |
| 2010/0180336 A1 | 7/2010 | Jones et al. | |
| 2010/0194692 A1 | 8/2010 | Orr et al. | |
| 2010/0217533 A1 | 8/2010 | Nadkarni et al. | |
| 2010/0292945 A1 | 11/2010 | Reynolds et al. | |
| 2010/0299145 A1 | 11/2010 | Nakadai et al. | |
| 2010/0315384 A1 | 12/2010 | Hargreaves et al. | |
| 2011/0007029 A1 | 1/2011 | Ben-David | |
| 2011/0032185 A1* | 2/2011 | Yamamoto | G06F 3/038 345/157 |
| 2011/0109170 A1 | 5/2011 | Chen et al. | |
| 2011/0169726 A1* | 7/2011 | Holmdahl | G06K 9/00342 345/156 |
| 2011/0254807 A1 | 10/2011 | Perski et al. | |
| 2012/0028686 A1* | 2/2012 | Shin | H04W 52/0254 455/566 |
| 2012/0050231 A1 | 3/2012 | Westhues et al. | |
| 2012/0068964 A1* | 3/2012 | Wright | G06F 3/03545 345/174 |
| 2012/0162057 A1 | 6/2012 | Tan et al. | |
| 2012/0242588 A1 | 9/2012 | Myers et al. | |
| 2012/0242592 A1 | 9/2012 | Rothkopf et al. | |
| 2012/0243151 A1 | 9/2012 | Lynch | |
| 2012/0243719 A1 | 9/2012 | Franklin et al. | |
| 2012/0327041 A1 | 12/2012 | Harley et al. | |
| 2012/0331546 A1* | 12/2012 | Falkenburg | G06F 21/36 726/16 |
| 2013/0120279 A1 | 5/2013 | Plichta et al. | |

OTHER PUBLICATIONS

U.S. Appl. No. 61/454,950, filed Mar. 21, 2011, Lynch (unpublished application).

U.S. Appl. No. 61/454,894, filed Mar. 21, 2011, Rothkopf (unpublished application).

Kyung et al., "wUbi-Pen : Windows Graphical User Interface Interacting with Haptic Feedback Stylus," *SIGGRAPH 2008*, Los Angeles, California, Aug. 11-15, 2008, 4 pages.

Lee et al., "Haptic Pen: A Tactile Feedback Stylus for Touch Screens," Proceedings of the 17th Annual ACM Symposium on User Interface Software and Technology, TR2004-133, Santa Fe, New Mexico, Oct. 24-27, 2004, 5 pages.

Song et al., "Grips and Gestures on a Multi-Touch Pen," *Chi 2011*, Session: Flexible Grips & Gestures, Vancouver, BC, Canada, May 7-12, 2011, pp. 1323-1332, (10 pages).

Tan et al., "Application of Capacitive Coupling to the Design of an Absolute-Coordinate Pointing Device," *IEEE Transactions on Instrumentation and Measurement* 54(5), Oct. 2005, pp. 2099-2104, (6 pages).

* cited by examiner

TOUCH-SENSITIVE SYSTEM WITH MOTION FILTERING

CROSS-REFERENCE TO RELATED APPLICATION

This application claims the benefit, under 35 U.S.C. § 119(e), of U.S. Provisional Patent Application No. 61/553,114, filed 28 Oct. 2011, which is incorporated herein by reference.

BACKGROUND

Technical Field

This disclosure generally relates to touch-sensitive systems.

Description of the Related Art

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF SUMMARY

DETAILED DESCRIPTION

Figure 1:
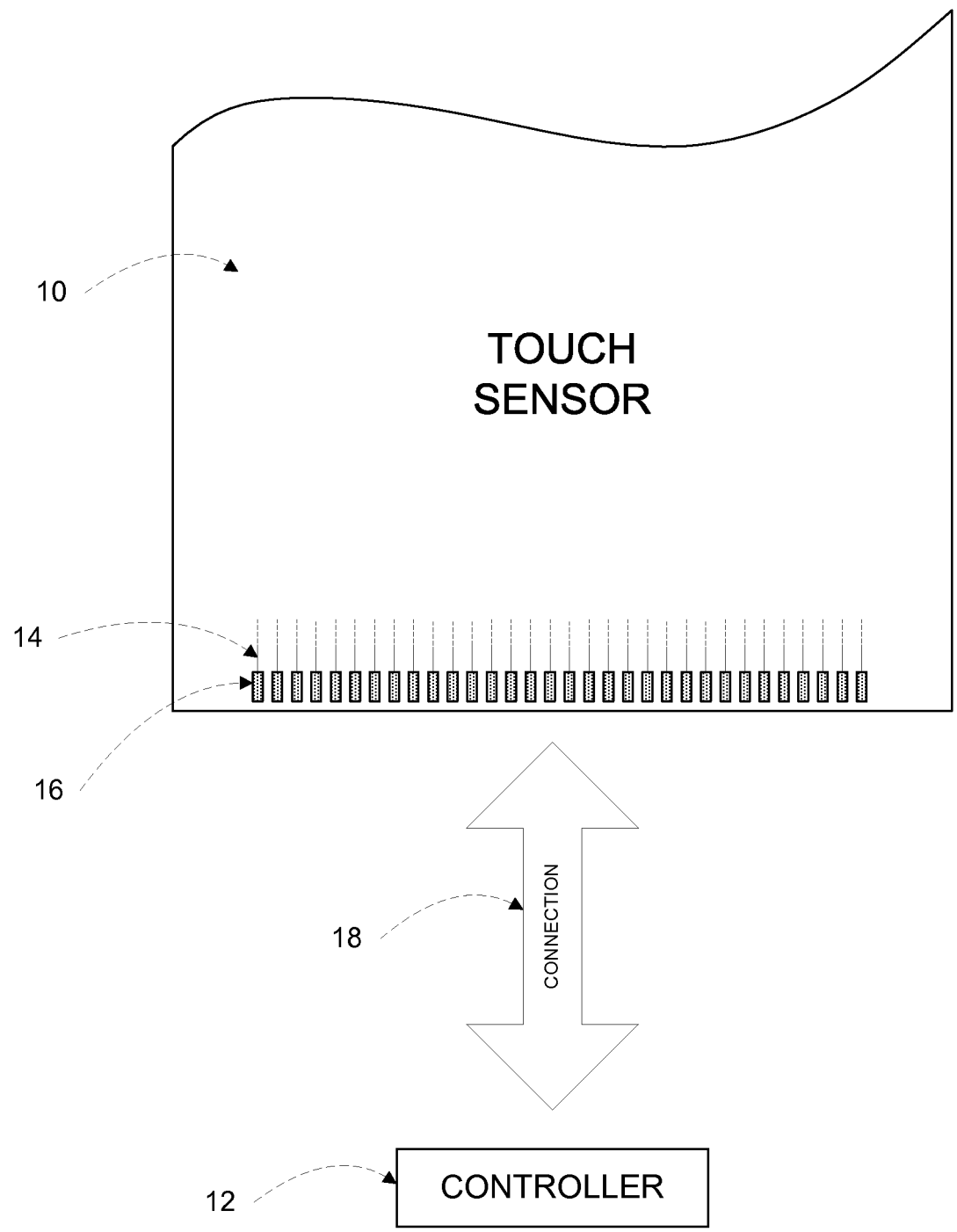
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example, and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
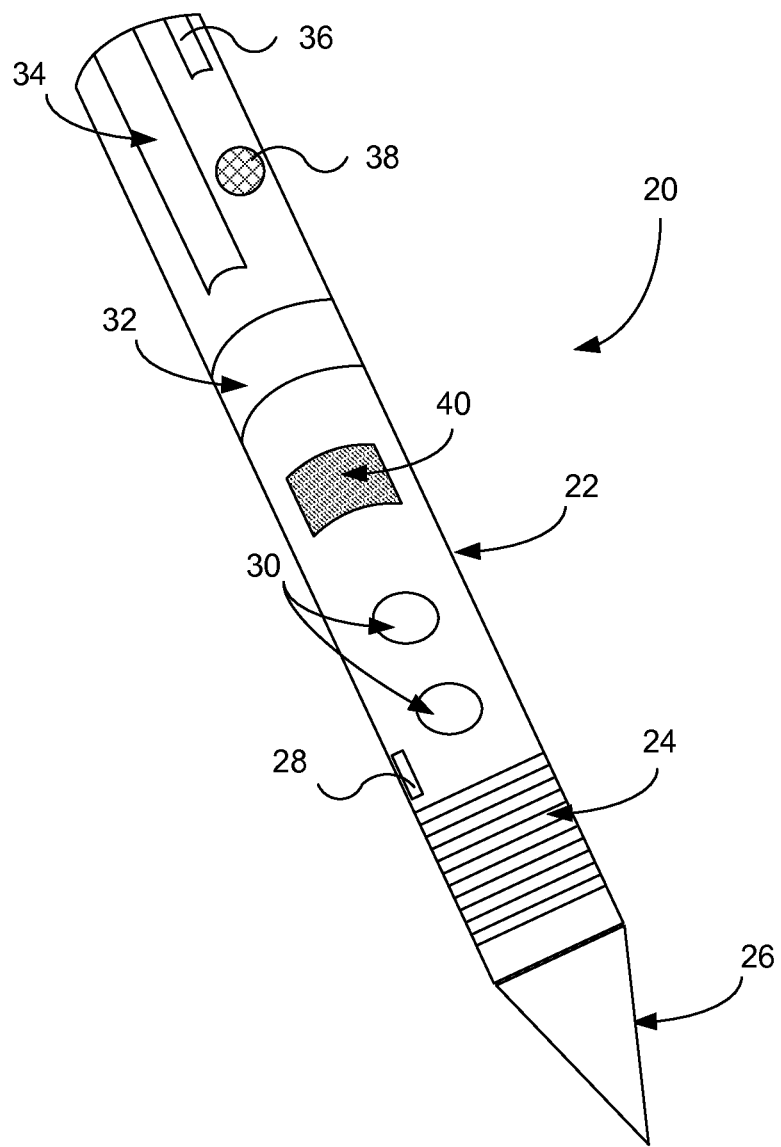
FIG. 2 illustrates an example active stylus exterior.

FIG. 2 illustrates an example exterior of an example active stylus 20. Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
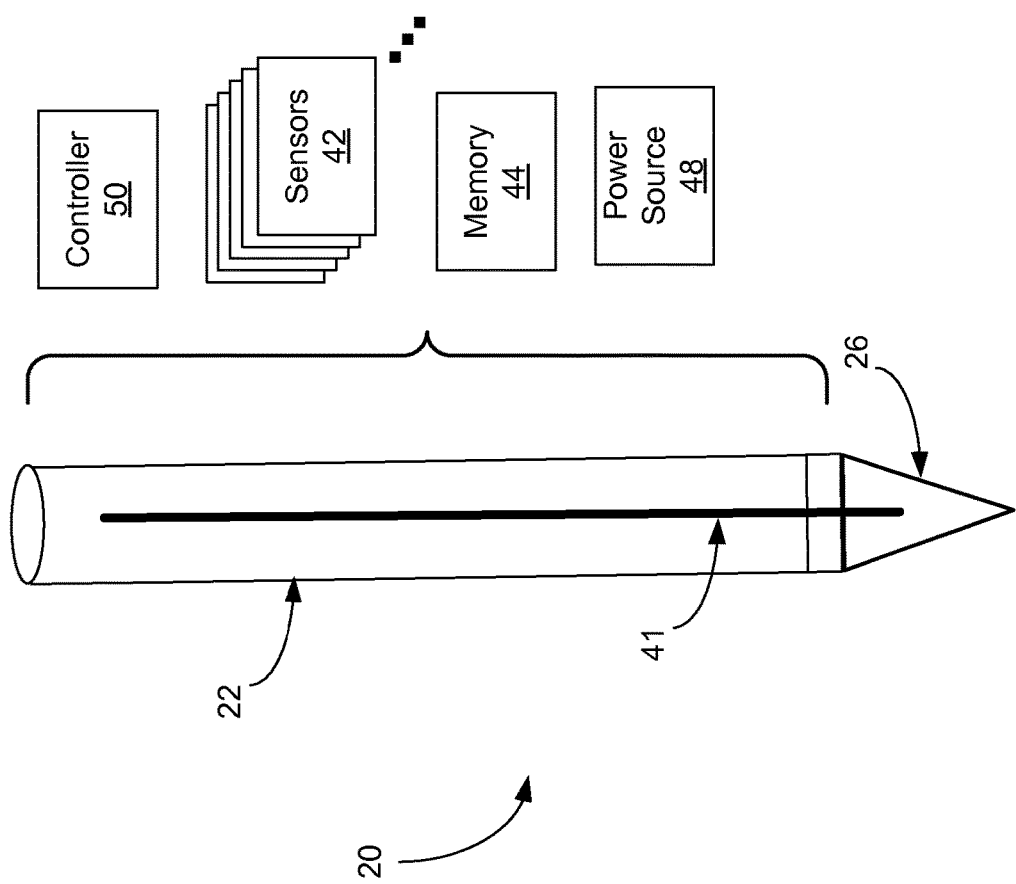
FIG. 3 illustrates an example active stylus interior.

FIG. 3 illustrates an example internal components of example active stylus 20. Active stylus 20 may include one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
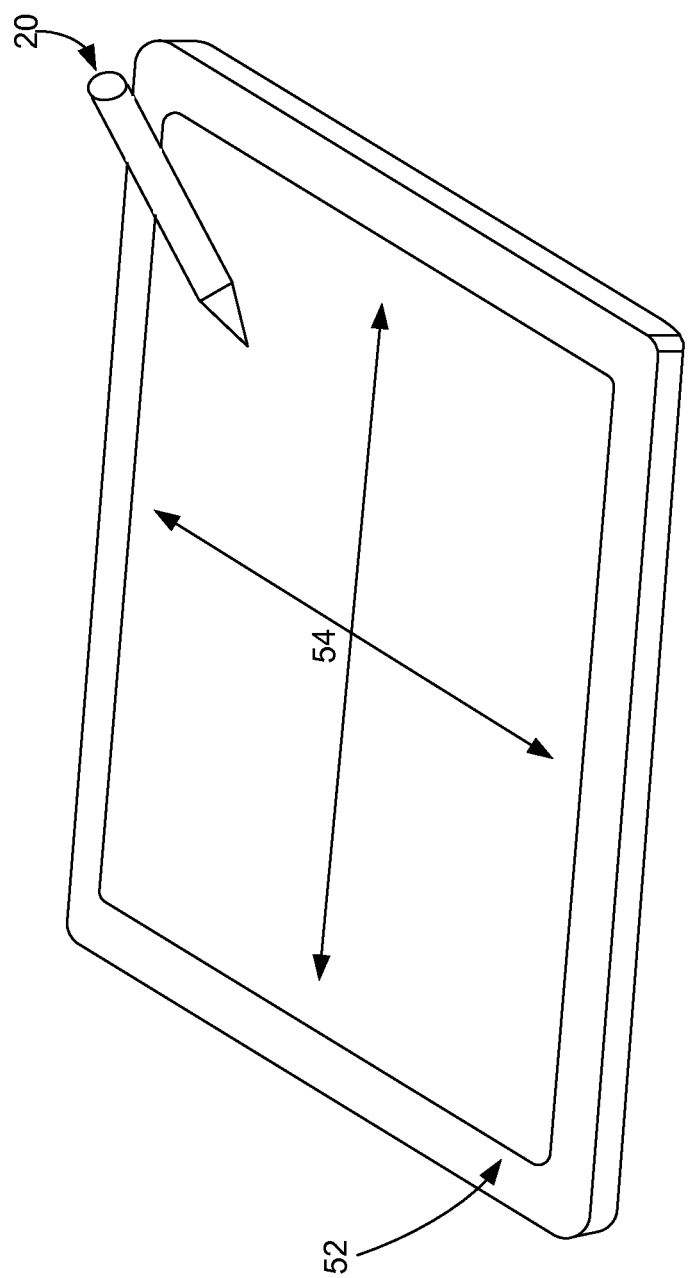
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined modulation scheme and/or bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in the proximity of device 52. As an example and not by way of limitation, interactions may include or be initiated by gestures such as shaking or inverting active stylus 20 on or near device 52, pressure placed on the tip of active stylus 20, or pressure placed on the body of active stylus 20 (for example, from a user's grip on the stylus). Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

In particular embodiments, motion of a stylus or a device may be associated with particular functionality. As an example, moving the stylus near a touch-sensitive element of the device may add to edit, or delete content displayed on the device. As another example, executing an authentication gesture with a stylus may provide access to data, content, menus, or settings associated with a user, stylus, device, or programs on the stylus or device. Motions and associated functions are not limited to the examples above, and this disclosure contemplates any suitable motion of a stylus or device associated with any suitable functionality. Moreover, although this disclosure describes or illustrates motion of a stylus, particular embodiments encompass motion of a person's finger or another object, such as a passive stylus or other suitable conductive object. Herein, particular embodiments described or illustrated as involving a stylus may, where appropriate, similarly involve a person's finger or another object other than a stylus. In addition, the descriptions and examples of this disclosure contemplate any suitable stylus, for example and not by way of limitation a passive or an active stylus.

Figure 5:
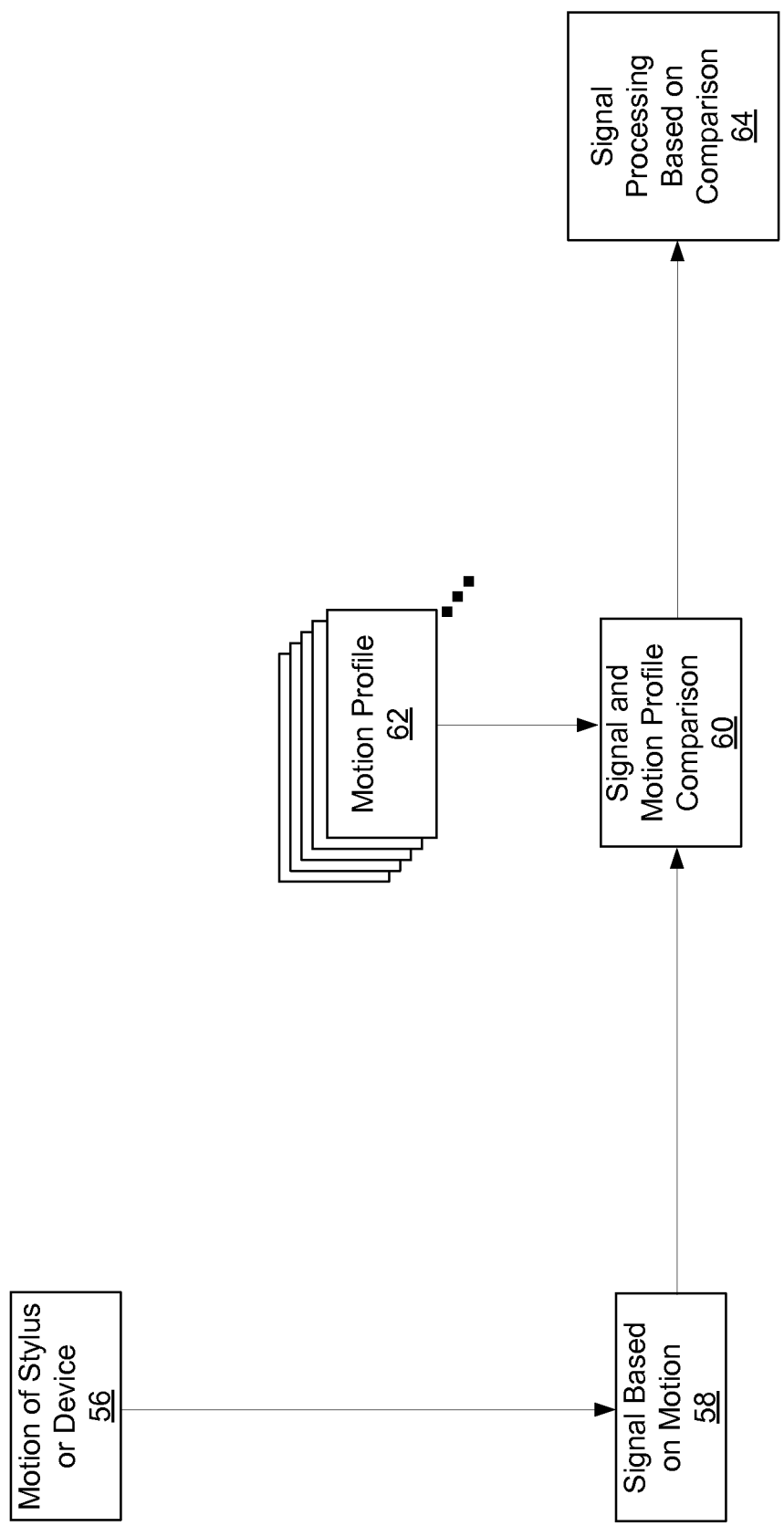
FIG. 5 illustrates an example method for determining whether motion of a stylus or device is unintentional and processing signals generated by the motion to correct for unintended motion.

Some of the motion of the stylus or the device may not be intended by a user, resulting in unintended functionality. "Unintended motion" may refer to motion in any dimension of a stylus, a device, or both relative to each other or relative to a fixed point. In particular embodiments, motion may be characterized as unintended, triggering functionality or preventing associated functionality from occurring, such as activation of components that consume large amounts of power. FIG. 5 represents an example method for determining whether motion of a stylus or a device is unintentional and correcting for the unintended motion. The method of FIG. 5 begins at step 56, where motion of a stylus, a device, or both occurs. At step 58, the motion of the stylus or the device produces one or more signals based on the motion, for example signals generated by an accelerometer, gyroscope, magnetometer, global positioning system (GPS), charge present in a touch-sensitive element of the device, or any suitable transducer. The signal may undergo any suitable processing or modification at any suitable stage or time from the signal's creation to its intended use, such as conveying information or providing functionality. In step 60, at any suitable stage from its creation to its intended use the signal, any portion of the signal, the signal's characteristics, or any suitable combination thereof is compared to one or more motion profiles 62. Motion profiles 62 define unintended motion by identifying particular signals, portions of signals, or characteristics of signals representing or relating to motion of a stylus, a device, or both. The signals or portions of signals identified may relate to signals at any suitable stage or time from the signal's creation to its intended use. As an example, signals identified by motion profile 62 may be based on the acceleration of the motion, the duration of the motion, the location or orientation of the stylus or device before, during or after the motion occurs, one or more temporal frequencies comprising the motion, a pre-defined motion or sequence of motions, the type of motion performed (such as rotation or translation), or any other suitable characteristic, type, or sequence of motions. As an example, signals identified by motion profiles 62 may include one or more frequencies or ranges of frequencies that indicate unwanted motion, such as shaking of the stylus created by involuntary shaking of the user or frequencies generated by walking with the stylus in a pocket. As another example, signals identified by motion profiles 62 may include information about the acceleration of the motion, such as sudden, extreme motion relative to normal acceleration during normal operation. As another example, signals identified by motion profiles 62 may comprise a sequence of motions of the stylus, such as particular rotations or repetitive motions that occur when a user is moving the stylus merely to move the stylus, not to access or initiate any functionality associated with the stylus or device. For instance, a user who absent-mindedly twirls a writing instrument may twirl the stylus in the same way, and signals representing this motion would be stored in motion profiles 62 and filtered. As another example, signals identified by motion profiles 62 may include information about the orientation of a stylus or device and their relative positions. For example, movement occurring when the stylus is nowhere near the device may be designated as unintended. As another example, a motion profile may identify one or more frequencies or ranges of frequencies, amplitudes or ranges of amplitudes, or other suitable characteristics or ranges of characteristics to filter from the signals. While the above examples reference movements of a stylus, signals identified by motion profiles 62 may also indicated unwanted movement of a device as well. Moreover, while this disclosure provides specific examples of types or characteristics of motion that may be described as unintended by a motion profile, this disclosure contemplates a motion profile describing any suitable motion, sequence of motions, or characteristics of motion.

In particular embodiments, motion profile 62 may be defined at least in part by a user of the stylus or the device, for example through a graphical user interface. Motion profile 62 may also be defined by the stylus or the device. As an example, a user may tag certain motions as unintended, for example by clicking a button on a stylus after a motion has been performed. The stylus or device records the tagged motion in motion profile 62, and over time may refine motion profile 62 by analyzing a set of characteristics common or frequently appearing in motion marked as unintended. As another example, the stylus or device may have a testing period in which the user performs a particular function, such as attempting to hold a stylus steady. In this example movement of the stylus such as involuntary shaking by the user or characteristics of the movement such as the user's shaking frequency are defined as unintended motion and stored in motion profile 62. In particular embodiments, motion profiles 62 may be pre-set and stored on a stylus or device before the stylus or device is used by a user. For example, motion with acceleration greater than around 1 meter per second may be pre-defined as unintended. In particular embodiments, any motion identified as unintended motion by motion profile 62 may be dynamically updated by a user, device, or stylus. For example, a stylus or device may edit or create a motion profile 62 by analyzing a set of characteristics common or frequently appearing in one or more motion profiles 62. A stylus or device may also edit or create a motion profile 62 by analyzing user interaction with the stylus or device. For example the stylus or device may create a motion profile 62 relating to motion that results in functionality a user consistently removes, such as content in a drawing program that a user consistently deletes. While this disclosure provides specific examples of defining unintended motion by a user, stylus, or device in motion profiles 62, this disclosure contemplates any suitable method of defining unintended motion of a stylus, user, or device in motion profiles 62.

After the comparison in step 60, the one or more signals based on motion of the stylus or the device are processed in step 64 to correct for unintended motion defined by motion profiles 62. Processing may occur on signals representing the stylus's motion, the device's motion, or both. In particular embodiments, a signal is processed by filtering from a signal one or more portions or characteristics of the signal defined as unintended motion. As an example, a stylus and device may undergo relative motion in a way the user does not intend, and this unintended motion results in signals the device processes as relative motion, leading to unintended functionality. One or more motion profiles 62 identifies the signal (at any suitable stage before, during, or after processing), or one or more of the signal's characteristics, created by unintended relative motion of the stylus and device. In particular embodiments, a motion profile 62 may indicate the device's motion is unintentional by combining the signals generated by unintended relative motion with signals from an accelerometer in the stylus (or device) indicating lack of movement by the stylus (or device). The signals generated by the unintended motion is then filtered by removing the portion of the signals representing unintended relative motion of the device as identified by motion profile 62, preventing unintended functionality from occurring. The signals resulting from movement returning the stylus or device to their relative positions prior to the unintended movement may also be filtered and removed. For example, a user may be using a stylus and device in a moving vehicle that experiences a sudden jolt. In this example, the stylus, the device, or both could undergo unintended motion, for example by the stylus losing contact with the touch-sensitive area of the device. Processing could occur on the unintended motion from the stylus, the device, or both to correct for the unintended motion. In addition, processing could occur on motion returning the stylus, the device, or both their intended actual or relative positions prior to the jolt causing the unintended motion. This disclosure contemplates filtering signals representing movement of a stylus or a device, or both. In addition, the signal (or its characteristics) stored by motion profiles 62 may occur at any suitable time before, during, or after the signal is processed by the device or stylus.

In particular embodiments, processing of signals in step 64 may be used to determine when or how to power one or more components on a stylus. As an example, a stylus may have a variety of power modes defining how components of the stylus are powered. Motion may be used to transition the stylus between two power modes. For example, shaking the stylus may transition the stylus from a low-power "sleep" mode to a full-power "on" mode. Motion, such as travelling with the stylus, may unintentionally replicate the motion used to trigger transitions from one power mode to another. If this motion is characterized as unintentional by one or more motion profiles 62, then the portion of the motion identified as unintentional may be filtered, preventing the associated transition between power modes. As another example, motion of a stylus may activate components or initiate processes that consume power, such as the transmission of high-voltage signals from electrodes in a stylus. If the motion that would activate components or initiate processes that consume power is defined as unintentional by one or more motion profiles 62, then the unintentional motion is filtered, conserving power. While this disclosure describes particular examples of filtering specific unintended motions that trigger particular power-related functionality, this disclosure contemplates filtering any suitable unintended motions that trigger any suitable power-related functionality.

In particular embodiments, a signal is processed by adding content to the signal. As an example, functionality associated with movements of a stylus may require the stylus to be in a specific orientation or location with respect to the device. If the stylus or device moves unintentionally, the orientation or location of the stylus relative to the device may be altered, preventing associated functionality from occurring. To correct for this when the device unintentionally moves, signals representing motion of the stylus may be processed by adding to the signals content representing the unintended movement of the device, simulating the proper maintenance of orientation/location of the stylus and device. For example, if a stylus is on the left half of a device's display, and the device unintentionally moves to the left, this leftward movement may be added to the stylus' subsequent motion in order to maintain relative stylus-device location prior to the unintended motion. In other words, signals generated by unintended relative motion of a device may be added as an offset to subsequent signals generated by intended motion of the stylus in order to account for the unintended motion. Likewise when the stylus unintentionally move, signals representing movement of the device may be processed by adding to the signals a portion representing the unintended movement of the stylus.

In particular embodiments, a signal is processed by performing any suitable operation on the signal, such as increasing or decreasing the amplitude of the signal or altering its component frequencies. While this disclosure provides specific examples of filtering, adding to, or altering signals representing motion of a stylus or a device to account for unintended motion, this disclosure contemplates any suitable processing of the signals to account for unintended motion.

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stylus, comprising:
   a pen-tip;
   at least one sensor selected from an accelerometer, a gyroscope, a global positioning system, a magnetometer, and a touch-sensitive element; and
   one or more computer-readable non-transitory storage media embodying logic operable when executed to:
      operate in one of a lower-power mode and a higher-power mode;
      detect, with the at least one sensor, defined one or more frequencies or defined one or more ranges of frequencies indicating shaking of the stylus, for a duration of a testing period of time;
      transition from the lower-power mode to the higher-power mode in response to stylus signals generated to represent the detection of the defined one or more frequencies or the defined one or more ranges of frequencies, wherein the testing period of time is set to prevent an unintentional transition to the higher-power mode triggered by unintentional motions of the stylus;
      be prevented from transitioning from the lower-power mode to the higher-power mode in response to detection of frequencies other than the defined one or more frequencies and ranges of frequencies other than the defined one or more ranges of frequencies; and
      in response to unintentional movement of a device in communication with the stylus, combine device signals representative of the unintentional movement of the device with the stylus signals to account for the unintentional movement of the device.

2. The stylus according to the claim 1, wherein
   the higher-power mode is a mode in which the logic is operable when executed to activate a component for transmitting a high-voltage signal from an electrode in the stylus, and
   the lower power mode is a mode in which the logic is operable when executed to deactivate the component.

3. The stylus according to claim 1, wherein
   the defined one or more frequencies or the defined one or more ranges of frequencies indicate unintentional shaking of the stylus as opposed to intentional shaking of the stylus.

4. A stylus, comprising:
   a pen-tip;
   a storage;
   at least one sensor selected from an accelerometer, a gyroscope, a global positioning system, a magnetometer, and a touch-sensitive element; and
   one or more computer-readable non-transitory storage media embodying logic operable when executed to:
      detect, with the at least one sensor, frequencies indicating motions of the stylus, for a duration of a testing period of time;
      filter out defined one or more frequencies or defined one or more ranges of frequencies as indicating unintentional motions of the stylus in reference to a motion profile stored in the storage; and
      initiate a defined function in response to stylus signals generated to represent detection of remaining frequencies which remain after the defined one or more frequencies or the defined one or more ranges of frequencies are filtered out from the frequencies,
      wherein, in response to unintentional movement of a device in communication with the stylus, the logic is operable to combine device signals representative of the unintentional movement of the device with the stylus signals to account for the unintentional movement of the device,
      wherein the defined function is transitioning from a lower-power mode of operation of the stylus to a higher-power mode of operation of the stylus, and
      wherein the testing period of time is set to prevent an unintentional transition to the higher-power mode triggered by unintentional motions of the stylus.

5. The stylus according to claim 4, wherein
   the defined one or more frequencies or the defined one or more ranges of frequencies indicate unintentional shaking or absent-minded twirling of the stylus.

6. The stylus according to claim 4, wherein
   the defined one or more frequencies or the defined one or more ranges of frequencies indicate motions with acceleration greater than a threshold acceleration value.

7. The stylus according to claim 6, wherein
   the defined one or more frequencies or the defined one or more ranges of frequencies indicate motions with acceleration greater than 1 meter per second.

8. The stylus according to claim 4, wherein
   the logic is operable when executed to update the motion profile stored in the storage identifying what the unintentional motions are.

9. The stylus according to claim 8, wherein
   the logic is operable when executed to update the motion profile based on at least one input selected from a user input, an input from the stylus, and an input from the device in communication with the stylus.

10. The stylus according to claim 8, wherein
    the logic is operable when executed to update the motion profile based on an analysis of a set of characteristics which are common or frequently appearing in the motion profile.

11. The stylus according to claim 8, wherein
    the logic is operable when executed to update the motion profile based on an analysis of user interaction with the stylus or of user interaction with the device in communication with the stylus.

12. The stylus according to claim 11, wherein
    the logic is operable when executed to update the motion profile relating to a motion that results in functionality a user consistently removes or deletes.

13. The stylus according to claim 11, wherein
    the logic is operable when executed to update the motion profile based on a user tagging certain motions as the unintentional motions.

14. The stylus according to claim 13, wherein
    the logic is operable when executed to update the motion profile based on a user clicking a button on the stylus after a certain motion has been performed to thereby tag the certain motion as the unintentional motion.

15. The stylus according to claim 13, wherein
    the logic is operable when executed to update the motion profile based on a user performing a certain motion for the testing period of time to define an intentional motion vis-à-vis the unintentional motion.

16. The stylus according to claim 4, wherein
    the logic is operable when executed to initiate the defined function in response to detection of the remaining frequencies, wherein the defined function is performed by the device which is in communication with the stylus.

17. The stylus according to claim 16, wherein
the logic is operable when executed to initiate the defined function in response to detection of the remaining frequencies, wherein the defined function is performed by the device to authenticate a user of the stylus.

18. The stylus according to claim 4, wherein
the logic is operable when executed to filter out the defined one or more frequencies or the defined one or more ranges of frequencies as indicating the unintentional motions of the stylus, by:
determining a first portion of received signals as resulting from the unintentional motion of the stylus in reference to the motion profile stored in the storage; and
processing the received signals to correct for the unintentional motion including:
 removing from the received signals the first portion of the received signals determined to have resulted from the unintentional motion; and
 retaining a second portion of the received signals, which is indicative of an intentional motion of the stylus and which is to initiate the defined function.

* * * * *

UNITED STATES PATENT AND TRADEMARK OFFICE
CERTIFICATE OF CORRECTION

| | | |
|---|---|---|
| PATENT NO. | : 11,327,583 B2 | Page 1 of 1 |
| APPLICATION NO. | : 16/579525 | |
| DATED | : May 10, 2022 | |
| INVENTOR(S) | : Esat Yilmaz et al. | |

It is certified that error appears in the above-identified patent and that said Letters Patent is hereby corrected as shown below:

In the Claims

Column 16, Claim 7, Line 23:
"acceleration greater than 1 meter per second."
Should read:
--acceleration greater than 1 meter per second$^2$.--

Signed and Sealed this
Twenty-third Day of January, 2024

Katherine Kelly Vidal
*Director of the United States Patent and Trademark Office*